United States Patent [19]
Goto

[11] Patent Number: 5,828,051
[45] Date of Patent: Oct. 27, 1998

[54] OPTICAL SCANNER AND BAR CODE READER EMPLOYING SAME

[75] Inventor: Hiroshi Goto, Yamatokoriyama, Japan

[73] Assignee: Omron Corporation, Kyoto, Japan

[21] Appl. No.: 833,664

[22] Filed: Feb. 11, 1992

[30] Foreign Application Priority Data

Feb. 21, 1991 [JP] Japan .................................. 3-041341
May 13, 1991 [JP] Japan .................................. 3-138307
Oct. 16, 1991 [JP] Japan .................................. 3-298235

[51] Int. Cl.⁶ ................................................ G06K 7/10
[52] U.S. Cl. .......................................... 235/467; 235/472
[58] Field of Search ................................. 235/467, 472

[56] References Cited

U.S. PATENT DOCUMENTS

| | | |
|---|---|---|
| 3,666,974 | 5/1972 | Dostal . |
| 3,921,045 | 11/1975 | Reich et al. . |
| 3,998,092 | 12/1976 | Maccabee . |
| 4,213,146 | 7/1980 | Maiman . |
| 4,732,440 | 3/1988 | Gadhok . |
| 4,902,083 | 2/1990 | Wells . |
| 4,919,500 | 4/1990 | Paulsen . |
| 5,079,641 | 1/1992 | Marino et al. . |
| 5,132,524 | 7/1992 | Singh ........................... 235/467 |
| 5,168,149 | 12/1992 | Dourkis ......................... 235/472 |
| 5,170,277 | 12/1992 | Bard ............................. 235/472 |
| 5,245,463 | 9/1993 | Goto . |

FOREIGN PATENT DOCUMENTS

| | | |
|---|---|---|
| 214863 | 3/1987 | European Pat. Off. . |
| 223535 | 5/1987 | European Pat. Off. . |
| 3833260 | 6/1989 | Germany . |

OTHER PUBLICATIONS

Derwent Publications Lrd., London, GB; AN 89–369379 & SU–A–1 485 188 (Tomsk Electrotec Wk) 7 Jun. 1989 *abstract*.

Derwent Publications Ltd., London, GB; AN 89–291939 & SU–A–1 448 328 (As Belo Tech Cybernetics) 30 Dec. 1988 *abstract*.

*Primary Examiner*—Harold Pitts
*Attorney, Agent, or Firm*—Dickstein Shapiro Morin & Oshinsky

[57] ABSTRACT

An optical scanner is disclosed which, in one embodiment, uses a reflection surface on a vibrating element having at least two modes of vibration in at least two respective planes to produce an image scanning beam. Each of the modes has an associated resonant frequency and the two resonant frequencies of the vibrating element are not integer multiples of one another. In another embodiment, a reflective element is used to bounce a light beam from the reflection surface back to the reflection surface to increase the angle of scanning of a light beam. The reflective element may be semitransparent which allows the scanning beam to be detected through the range of scanning to ensure proper scanning. The optical scanner is particularly useful as a hand-held bar code scanner.

18 Claims, 10 Drawing Sheets

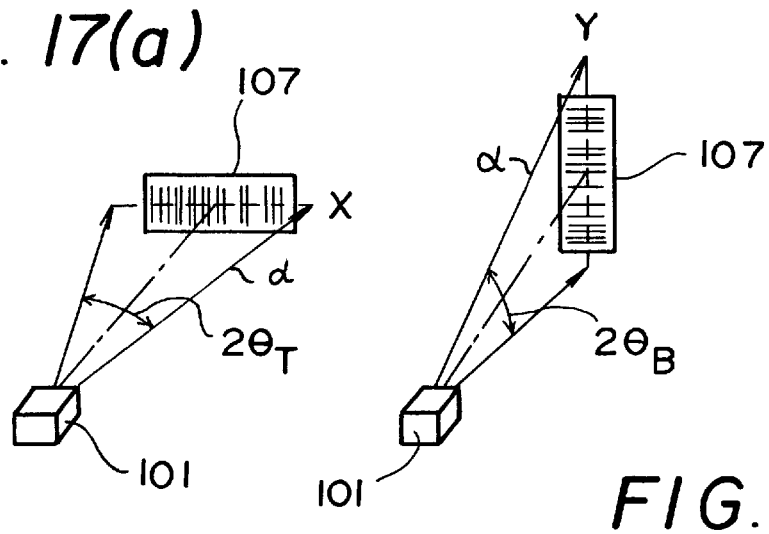
FIG. 17(a)
FIG. 17(b)
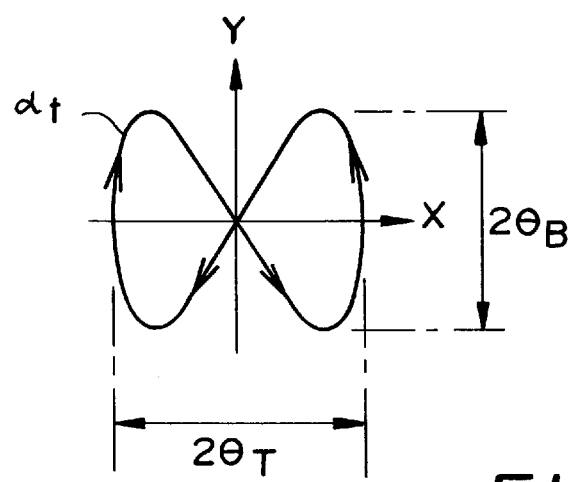
FIG. 18

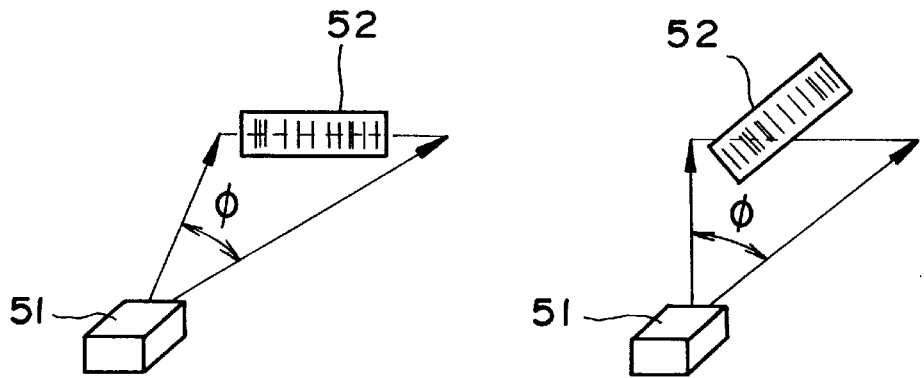
FIG. 19(a)
FIG. 19(b)
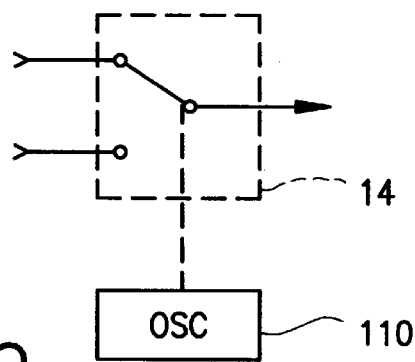
FIG. 20

OPTICAL SCANNER AND BAR CODE READER EMPLOYING SAME

FIELD OF THE INVENTION

This invention relates to an optical scanner used, for example, in a laser printer or a point-of-sale (POS) device, which causes a light beam to scan an area using a pattern of scan lines.

TECHNOLOGICAL BACKGROUND (A) Background of the Invention

FIG. 10 shows the configuration of an existing optical scanner. The scanner uses polygonal mirror 31, which is in the shape of a regular polygon whose outer edges are coated with mirror surfaces 31a, 31a, and so on. Polygonal mirror 31 is rotated at a fixed angular velocity by DC servomotor 32, which is controlled by driver circuit 35. Laser beam α, emitted by semiconductor laser device 36, is focused by imaging lens 33 and projected onto one of the mirror surfaces 31a of polygonal mirror 31. When laser beam α is reflected off mirror surface 31a, it passes through beam scanning lens 34 and strikes the surface of, for example, light sensitive drum 37. When polygonal mirror 31 is rotating at a fixed angular velocity, the angle at which laser beam α strikes mirror surface 31a will vary, and consequently the direction in which laser beam α is reflected will also vary. In this way laser beam α can scan the surface of, for example, a light-sensitive drum.

However, an optical scanner employing a polygonal mirror must necessarily be large, and the laser beam is limited to scanning one line only in a single plane.

In order to produce a more compact scanner which is capable of scanning around multiple axes, the inventor developed an optical scanner of a novel configuration which is disclosed in U.S. patent application Ser. No. 07/741,353, filed Aug. 7, 1991. This scanner caused a light beam to scan in, for example, two directions by using a vibrating element with modes of vibration (or modes of elastic deformation) in two directions. Vibration was induced in this vibrating element at the resonant frequency corresponding to each mode of vibration. In other words, when vibration from an external source was induced in the vibrating element at a drive frequency conforming to one of the resonant frequencies, the vibrating element would vibrate at that frequency in the appropriate mode of vibration, and the light beam would scan.

FIG. 9 is a graph illustrating the relationship between the drive frequency and the amplitude of vibration of the vibrating element used in the optical scanner described in U.S. patent application Ser. No. 07/741,353. As can be seen in the graph, the vibrating element responds to drive frequencies n times greater than its resonant frequency $f_m$ (the subscript is an index used to distinguish the modes of vibration) and to frequencies 1/n times as great (n is an integer which is greater than or equal to 2). The element will vibrate at an amplitude ranging from ½ or ⅓ to 1/20 or 1/30 the amplitude of vibration achieved when the drive frequency is equal to the resonant frequency $f_m$. This being the case, externally supplied vibration at frequencies corresponding to higher harmonic or sub-harmonic components of the element's resonant frequency $f_m$, i.e., n·$f_m$ or $f_m$/n (where n=2, 3, ... ) will cause the element to resonate, and vibration will be induced at these harmonic frequencies.

Let us assume that we are using an element capable of vibrating in two axial directions. Let us also assume that the resonant frequencies $f_T$ and $f_B$ of the two modes of vibration of this element are integral multiples of each other. When vibration of resonant frequency $f_T$ is induced in the element and the light beam is caused to scan, the drive frequency will cause a disturbance which is at a harmonic frequency with respect to the other mode of vibration. The drive source will induce vibration in the mode of vibration corresponding to resonant frequency $f_B$, at a harmonic frequency of $f_B$. When a vibrating element of this type is being designed, carelessness in setting resonant frequencies $f_T$ and $f_B$ can result in small amplitude vibration in an un-anticipated direction. A scanner with this defect will have a poor scanning accuracy.

In addition, with the FIG. 10 scanner, the angle of scanning is fixed and it is difficult to increase the width of the scanning range. The optical scanner depicted in FIG. 10 also requires that the time at which the scanning of laser beam α begins and ends be detected. This is accomplished by placing photoreceptor elements 39 and 40 at the ends of the angle β over which laser beam α scans (i.e., the range over which it scans). The time at which laser beam α strikes photoreceptor element 39 on one end of the range is then considered to be the starting time for one scan, and the time at which it strikes element 40 on the opposite end of the range is considered to be the ending time for one scan.

The placement of sensors 39 and 40 also reduced the actual usable range of scanning (the effective width of scanning). Another difficulty was that the detection of the timing was limited to the initiation and completion of the scan; no means was available to detect the position of the light beam between its starting and ending points. It was difficult, then, to improve the accuracy of the optical scanner, to increase the scanning angle and to increase the repeatability of scanning during the intermediate portion of the scan.

It is also known to use light scanning devices in bar code scanners including pen-type scanners, image sensors and laser scanners. Because laser scanners, i.e., scanners using laser light, can read bar codes even when the scanner and the code are at some distance from each other, they have come to be used widely for such applications as stock flow monitoring and POS control.

Present laser-type bar code scanners are based on the FIG. 10 arrangement and work by causing laser light emitted by a laser light source such as a semiconductor laser element to be reflected by a polygonal mirror. This mirror rotates to cause the laser light to scan. The limitation of this design is that the laser light can scan only in a previously determined plane. As is shown in FIG. 19(a), which schematically shows the FIG. 10 scanner used as a bar code scanner 51, the scanner can read the bar code correctly only if scanning plane φ of bar code scanner 51 is properly aligned with the plane in which bar code (or bar code label) 52 lies. As is shown in FIG. 19(b), if the scanning plane φ of bar code scanner 51 is tilted away from the plane in which bar code 52 lies, the bar code cannot be read. In order to read bar code 52, the operator must either reposition the bar code or tilt scanner 51. This is a nuisance for the operator. Another problem is that the essential components, such as the polygonal mirror 31 and the servomotor 32 which rotates it, place a limitation on the miniaturization of the scanner.

Bar code scanners have been offered which use holographic elements or multiple mirrors within the scanner to enable the laser bear to scan in multiple directions. However, all the structural components for this type of scanner are large, so the scanner itself is necessarily relatively large and heavy. This type of scanner can be made as a stationary device, but it cannot conveniently be used as a hand-held bar code scanner.

This invention has been designed to overcome the defects of existing scanners which have been described above.

(B) Summary of the Invention

One object of this invention is to insure the segregation of the various modes of vibration in an optical scanner employing a vibrating element with at least two modes of vibration. This will prevent the decline in scanning accuracy which results when different modes of vibration are mixed.

To accomplish this first objective, an optical scanner uses a vibrating element to reflect a light beam which has modes of vibration in at least two planes and is made to rotate in those planes by being driven at the resonant frequency corresponding to each mode. It is also equipped with a drive source to induce oscillation in the vibrating element at the two resonant frequencies. The resonant frequencies associated with each of the modes of vibration of the vibrating element are selected so as not to be in a relationship of integral multiples of each other. Preferably, a harmonic frequency of the resonant frequency for a given mode of vibration is separated from the resonant frequency of any other mode of vibration by at least 10% of the value of the resonant frequency of that mode of vibration.

Since the resonant frequencies associated with the various modes of vibration of the vibrating element are not integral multiples of each other, the resonant frequency of a specific mode of vibration will not conform to a harmonic frequency of the resonant frequency of one of the other modes of vibration. This improves the segregation of the various modes of vibration while scanning is being executed through vibration in a single mode. It also prevents the induction of vibration at a higher harmonic of one of the other modes of vibration when the vibrating element is being driven at the resonant frequency of a given mode of vibration. The design thus prevents a decrease in scanning accuracy. As a result, if the scanner is used in, for example, a light beam scanning system in a laser printer, an improved print quality can be obtained.

A second object of this invention is to provide a compact optical scanner with an adjustable range of scanning. This scanner has a large effective scanning range, and is capable of detecting the position of the light beam during an intermediate portion of the scan.

To accomplish this second objective, the optical scanner of this invention uses a scanning element located on the opposite end of a deformable shaft from a vibrating element, with the scanning element being positioned in such a way that it can induce elastic vibration in the shaft in at least one mode of deformation when oscillation is induced in the vibrating element. A mirror surface is provided on the scanning element and a reflective mirror is positioned with reference to the mirror surface of the scanning element which causes a light beam from a source to reflect off the mirror surface to the reflective mirror where it reflects back to the mirror surface and is reflected again as a scanning beam which can encompass a wide scanning angle.

The scanning element, deformable shaft and the vibrating element containing the mirror surface can all be made in the form of a flat plate, and a very small actuator, such as a piezoelectric actuator, can be used as the drive source. Since a reflective mirror is all that needs to be added, this optical scanner can assume an extremely compact form. If vibration with the resonant frequency of another mode of elastic deformation is induced in the vibrating element, the direction of scanning can be changed. Furthermore, the amplitude of elastic vibration occurring in the deformable shaft (the angle of rotation of the scanning element) can be changed by causing the drive source to vary the amplitude at which the vibrating element oscillates. Thus it is possible to adjust the angle over which the light beam scans.

The reflective mirror is positioned to face the mirror surface of the scanning element. Accordingly, the light beam is reflected by the mirror back to the mirror surface where it is reflected again by the mirror surface. In this way the mirror surface reflects the beam at least twice. This results in an angle of scanning at least four times as large as the angle over which the deformable shaft rotates. In this way a large scanning range can be achieved.

In a variant, a semitransparent panel can be used in place of the reflective mirror. This panel reflects one portion of the optical beam while transmitting another portion. A device for detecting an optical beam which detects either the light beam reflected by the semitransparent panel or that transmitted by the mirror surface may be used to determine beam position.

Since the semitransparent panel transmits one portion of the light beam reflected by the mirror surface and reflects the remaining portion, one portion of the beam can be used for scanning while the other is used to detect the scanning position at any given moment. By monitoring the course traversed by the light beam used for position detection, one can accurately determine the position of the scanning beam during an intermediate portion of the scan. This design allows a wide effective scanning range to be achieved without the curtailment caused by the photoreceptor elements which were used to detect the light beam in previous optical scanners.

The mirror surface of the scanning element re-reflects that portion of the light beam reflected by the semitransparent panel. This beam, reflected at least twice by the mirror surface, can be used for scanning while the position of the light beam transmitted by the semitransparent panel is used for detection. With this scheme, the scanning position can be monitored by the detection device while a wide scanning range can be ensured for the scanning beam. Alternatively, the light beam reflected by the semitransparent panel and the mirror surface can be used for detection, while the beam which passes through the panel is used for scanning. Either way improves the accuracy or resolution of position detection.

A third object of this invention is to provide a compact, light-weight bar code scanner which can read a bar code, even when that code is tilted with respect to the plane of scanning.

The bar code scanner of the invention is equipped with: an optical scanner comprising a shaft capable of at least two modes of elastic deformation, a vibrational input element on one end of the deformable shaft, a driven element on the other end of the shaft to reflect a light beam, and a drive source to induce oscillation in the driven element which will cause this element to rotate in at least two planes; a light source which emits a light beam aimed at the driven element of the optical scanner; and a photodetector element which receives the light reflected by the bar code.

Since this bar code scanner uses an optical scanner which is capable of scanning a beam in at least two directions, it can scan a light beam along a bar code even when that code is tilted with respect to the plane of the scanner. Thus its photodetector element can read a tilted bar code.

Further, this optical bar code scanner is relatively small and light in comparison with one using a polygonal mirror and a servomotor, producing a compact, lightweight scanner particularly suitable as a hand-held bar code scanner.

The above and other objects, advantages and features of the invention will be more readily understood from the following detailed description of the invention which is provided in connection with the accompanying drawings.

BRIEF DESCRIPTION OF THE DRAWINGS

FIGS. 17(a) and 17(b) are perspective views illustrating the situations in which the same bar code scanner might be used;

FIG. 18 shows another path traced by a light beam when the beam is made to scan by the same bar code scanner;

FIGS. 19(a) and 19(b) are perspective views of situations which may occur when a laser beam is made to scan in the direction of a bar code by an existing laser-type bar code scanner; and FIG. 20 shows a directional switch which may be used in the FIG. 15 embodiment.

DETAILED DESCRIPTION OF THE INVENTION

Figure 1:
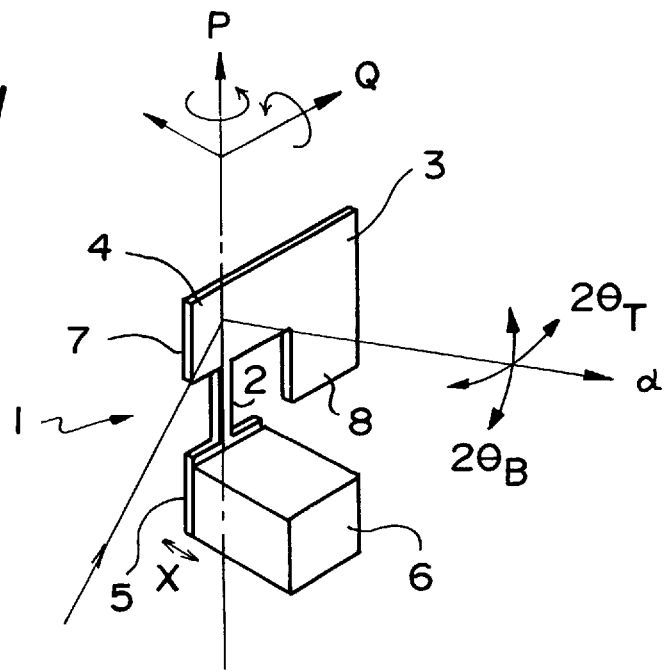
FIG. 1 is a perspective view of an embodiment of this invention.

FIG. 1 shows an optical scanner in which a first embodiment of this invention is implemented. Optical scanner 1 is identical to the optical scanner described in U.S. patent application Ser. No. 07/741,353, filed Aug. 7, 1991. It consists of vibrating element 7, which is formed of a single plate; and small drive source 6, which generates infinitesimal vibration in a piezoelectric or magnetostrictive actuator or the like.

Figure 2:
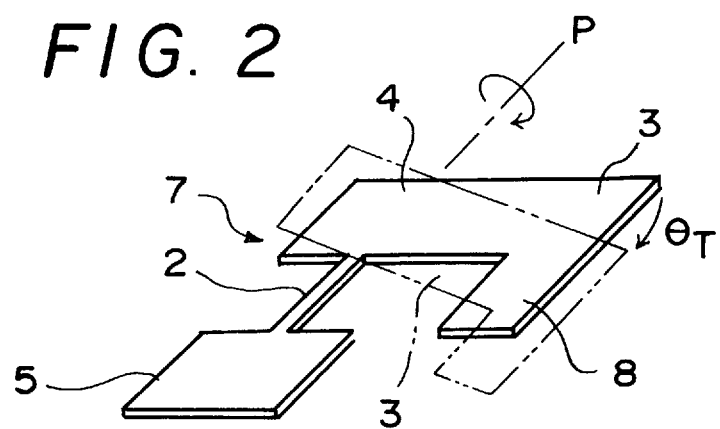
FIG. 2 is a perspective view of the plate in the same embodiment which shows its twisting mode.
Figure 3:
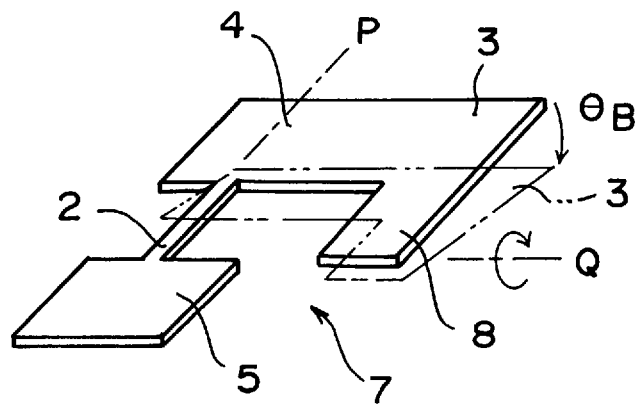
FIG. 3 is a perspective view of the same plate showing its bending mode.

The shape of plate 7 is better illustrated in FIGS. 2 and 3. Deformable shaft 2 is long and narrow. Its lower end widens to form vibrator 5, which applies the oscillation produced by drive source 6. Its upper end widens to form a scanning element 3, which causes a laser beam to scan. Deformable shaft 2 has two modes of elastic deformation. One is the twisting mode, in which the shaft rotates with respect to its axis P, as shown in FIG. 2. The other is the bending mode, in which the shaft bends lengthwise along its axis P, as shown in FIG. 3. The elastic vibration occurring in the twisting mode has a resonant frequency of $f_T$ and that occurring in the bending mode has a resonant frequency of $f_B$.

Scanning element 3 is formed in such a way as to be imbalanced with respect to the center of balance P of deformable shaft 2. To insure this imbalance, weight unit 8 has been added off-center from deformable shaft 2. A weight unit is also placed above the upper end of the shaft 2. Scanning element 3 has a mirror surface 4 to reflect a laser beam. This mirror surface may comprise the entirety of scanning element 3 or only a part of it. In the embodiment shown in FIG. 1, the mirror is positioned in the vicinity of the center of the shaft P.

Vibrator 5 is glued or joined to the piezoelectric actuator or its equivalent device in drive source 6 and is thus fixed to the drive source. Scanning element 3 is freely supported by deformable shaft 2. Drive source 6, which employs a piezoelectric actuator or the like to induce high frequency vibration (for example, several hundred Hz) in vibrator 5, is controlled by a drive circuit. This circuit excites vibration of resonant frequency $f_T$ in twisting mode and vibration of resonant frequency $f_B$ in bending mode.

Figure 7:
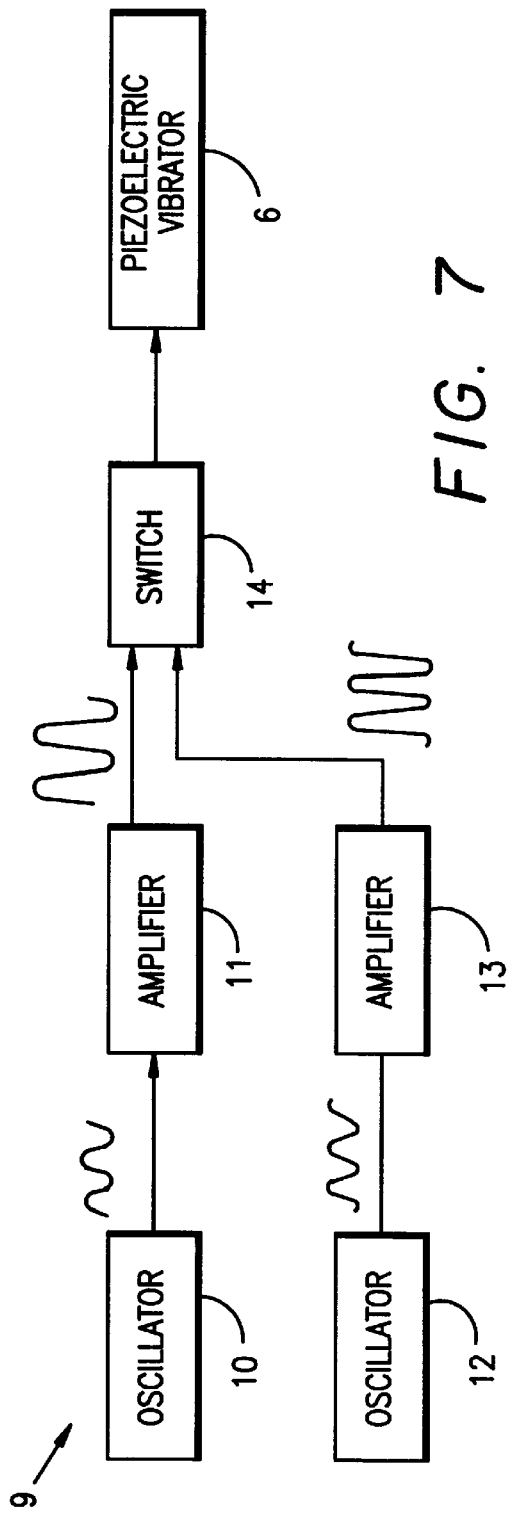
FIG. 7 is a block diagram of a drive circuit to power the drive source.

FIG. 7 shows an example of a drive circuit 9. It comprises: oscillator 10, which continuously outputs a voltage signal of a frequency matching the resonant frequency $f_T$ of the twisting mode; amplifier 11, which amplifies the voltage signal output by oscillator 10; oscillator 12, which continuously outputs a voltage signal of a frequency matching the resonant frequency $f_B$ of the bending mode; amplifier 13, which amplifies the voltage signal output by oscillator 12; and switch 14, which switches between the output voltage of frequency $f_T$ from amplifier 11 and the output voltage of frequency $f_B$ from amplifier 13, and applies one of these voltages to drive source 6. Alternatively, switch 14 can be replaced by a mixing circuit which applies to drive source 6 a mixed signal having as components the voltage signal of frequency $f_T$ from amplifier 11 and that of frequency $f_B$ from amplifier 13. If switch 14 is placed between oscillators 10 and 12 and an amplifier, one amplifier can be made to serve both oscillators.

Figure 8:
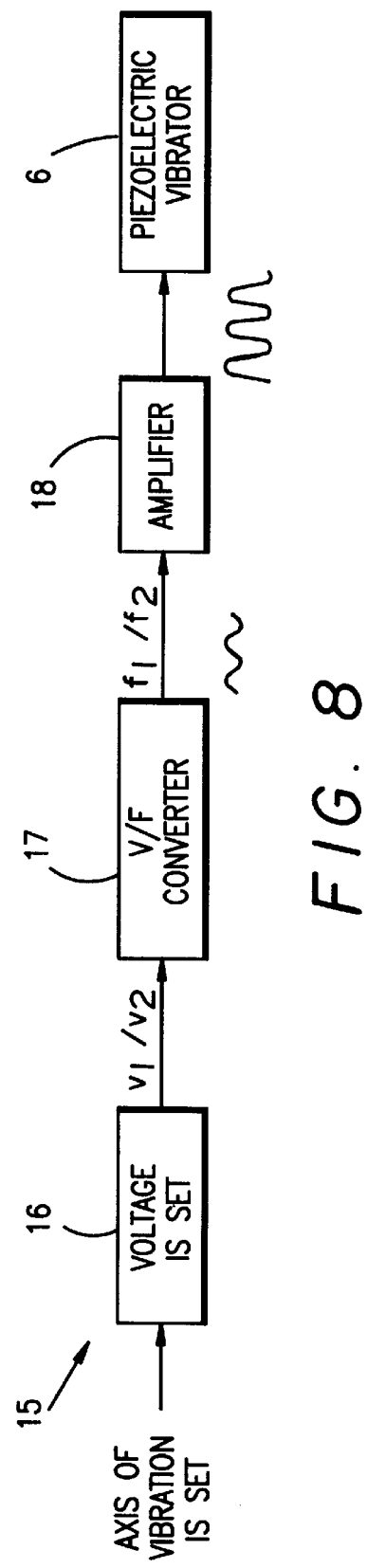
FIG. 8 is a block diagram of another example of a drive circuit to power the drive source.

Another drive circuit 15, is shown in FIG. 8. It comprises voltage reference unit 16, voltage/frequency converter 17 and amplifier 18. Voltage signal $V_1$ (or $V_2$) is output by voltage reference unit 16 based on an entered drive shaft command signal, which, for example, is set at the operator's discretion. This voltage signal $V_1$ (or $V_2$) is converted to the corresponding signal of frequency $f_T$ (or $f_B$) by voltage/frequency converter 17, and the converted signal is amplified by amplifier 18. The signal of resonant frequency $f_T$ (or $f_B$) is then applied to drive source 6.

In FIGS. 7 and 8, the frequency signal applied to drive source 6 is pictured as a sine wave; however a rectangular or triangular wave can be used to yield the same result.

In operation, drive source 6 is made to vibrate at a given frequency by the drive circuit, and this vibration is applied to vibrator 5. This vibrator will undergo reciprocating oscillation in direction x, as shown in FIG. 1. Inertia acts on scanning element 3 to cause shaft 2 to elastically deform and vibrate in the direction in which force is applied. When the drive frequency f which is applied to vibrator 5 matches frequency $f_T$, which characterizes the twisting mode, or frequency $f_B$, which characterizes the bending mode, elastic vibration of the given mode will be amplified in deformable shaft 2, and scanning element 3 will be driven over a large angle of rotation.

Figure 4:
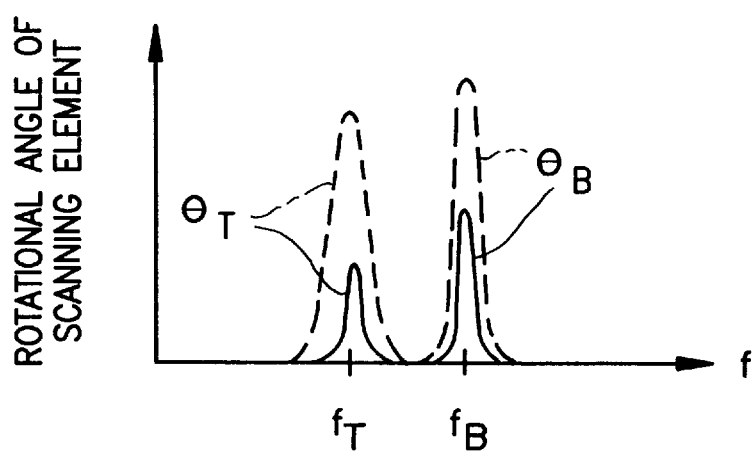
FIG. 4 is a graph which shows the relationship between the drive frequency and the angle of rotation of the scanning element.

The relationship between drive frequency f and angle of rotation $\theta_T$ of scanning element 3, which obtains during twisting mode, or angle of rotation $\theta_B$, which obtains during bending mode, is shown in FIG. 4. This graph shows the relationship between the drive frequency f of drive source 6 and the angle of rotation of scanning element 3 when the resonant frequency $f_T < f_B$. The horizontal axis is the drive frequency f, and the vertical axis is the angle of rotation $\theta_T$ of the scanning element in twisting mode or the angle of rotation $\theta_B$ of the same unit in bending mode. As can be seen, the angle of rotation $\theta_T$, which obtains in twisting mode, reaches its maximum when the drive frequency f is equal to $f_T$. The value of the angle drops off sharply on either side of the peak. The angle of rotation $\theta_B$, which obtains in bending mode, reaches its maximum when the drive frequency f is equal to $f_B$ and drops off sharply on either side of the peak. Thus even drive source 6, which is capable only of the infinitesimal vibration produced by a piezoelectric actuator, can cause mirror surface 4 to rotate over a large angle by producing drive vibration of the same frequency as the resonant vibration characterizing each mode of elastic deformation.

The voltage applied to drive source 6 can be adjusted while the drive frequency f which is applied by drive source 6 to vibrator 5 is maintained at one of the possible resonant frequencies. In this way the amplitude x of the vibration of vibrator 5 can be changed, and the angle of rotation $\theta_T$ or $\theta_B$ of scanning element 3 can be controlled. In FIG. 4, the dotted and solid lines show the amplitude of vibration of vibrator 5, with the dotted line representing a greater amplitude. As the amplitude x of the vibration of vibrator 5 increases, the angle of rotation $\theta_T$ or $\theta_B$ of scanning element 3 also increases.

Figure 5:
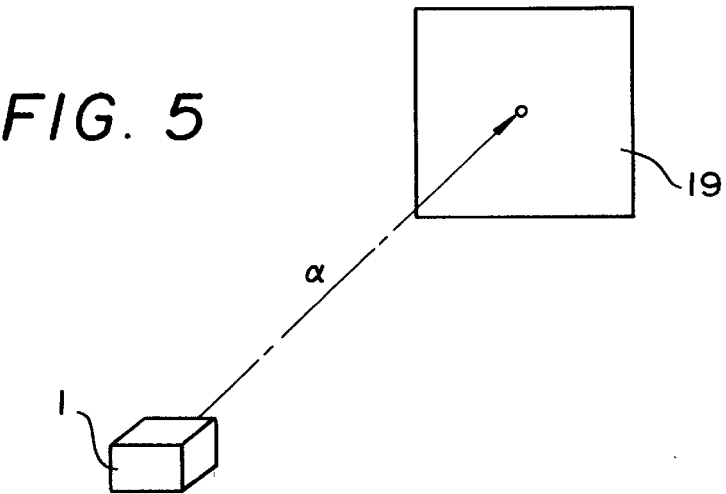
FIG. 5 is a perspective view illustrating how the optical scanner of this invention can direct a laser beam onto a screen.
Figures 6A, 6B, 6C:
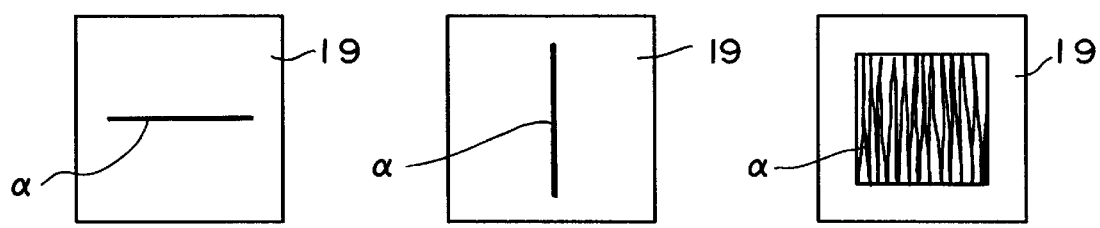
FIGS. 6(a), 6(b) and 6(c) show the traces made by a laser beam canned across a screen in each of three modes.

When vibrator 5 is made to vibrate at resonant frequency $f_T$ in twisting mode, the torsional vibration is amplified in the deformable shaft, and scanning element 3 is made to rotate on its axis P over angle of rotation $\theta_T$, as shown in FIG. 2. If at this time laser beam α is made to strike mirror surface 4 as shown in FIG. 1, the reflected laser beam α will scan over an angle of $2\theta_T$, which is twice the angle of rotation $\theta_T$ of scanning element 3. Thus if laser beam α, reflected off optical scanner 1, is made to strike screen 19 as shown in FIG. 5, it will scan to the left and right as shown in FIG. 6(a).

When vibrator 5 is made to vibrate at resonant frequency $f_B$ in bending mode, the flexural vibration is amplified in the deformable shaft, and scanning element 3 is made to rotate around an axis Q, orthogonal to its axis P, over angle of rotation $\theta_B$, as shown in FIG. 3. If at this time laser beam α is made to strike mirror surface 4, the reflected laser beam α will scan over an angle of $2\theta_B$, which is twice the angle of rotation $\theta_B$ of scanning element 3. Thus if laser beam α, reflected off optical scanner 1, is made to strike screen 19, it will scan up and down as shown in FIG. 6(b).

If vibrator 5 is made to vibrate in a mode in which the two types of vibration are superposed, so that both resonant frequency $f_T$ of twisting mode and resonant frequency $f_B$ of bending mode are produced, both torsional and flexural vibration will be amplified in deformable shaft 2, and scanning element 3 will be made to vibrate over angle of rotation $\theta_T$ around axis P and over angle of rotation $\theta_B$ around axis Q. When laser beam α, reflected off scanning element 3, strikes screen 19, it will scan the entire surface, as shown in FIG. 6(c).

Thus the user can select one of the two orthogonal directions of scanning available in this optical scanner by selecting one of the resonant frequencies as the drive frequency of drive source 6. The amplitude x of the vibration of vibrator 5 can be adjusted by controlling the voltage applied to drive source 6. In this way, the angle of scanning $2\theta_T$ or $2\theta_B$ can be controlled.

In the optical scanner of this invention, the following improvements have been implemented in the scanner described above. Let us call the value of the turning rigidity of axis P (or the torsional rigidity) of deformable shaft 2 $K_T$, and the rotational inertial moment of axis P in scanning element 3 $I_T$. The resonant frequency $f_T$ of deformable shaft 2 with respect to the twisting mode of deformation can then be determined by Formula 1, which is given below.

$$f_T = \frac{1}{2\pi} \sqrt{\frac{K_T}{I_T}}$$

If we call the value of the turning rigidity of axis Q (or the flexural rigidity) of deformable shaft 2 $K_B$, and the rotational inertial moment of axis Q in scanning element 3 $I_B$, then the resonant frequency $f_B$ of deformable shaft 2 with respect to the bending mode of deformation can be determined by Formula 2, which is given below.

$$f_B = \frac{1}{2\pi} \sqrt{\frac{K_B}{I_B}}$$

The rigidity values $K_T$ and $K_B$ are determined by the material and form chosen for deformable shaft 2. Similarly, the rotational inertial moment values $I_T$ and $I_B$ are determined by the material and form of scanning element 3.

In the first optical scanner of this invention, the shapes of deformable shaft 2 and scanning element 3 are designed and the materials chosen in such a way as to prevent the resonant frequency $f_T$ of the twisting mode and the resonant frequency $f_B$ of the bending mode from being integral multiples of each other. To express this in concrete terms, resonant frequency $f_T$ is not allowed to be identical to any of the harmonic frequencies $n \cdot f_B$ or $f_B/n$ of resonant frequency $f_B$; and resonant frequency $f_B$ is not allowed to be identical to any of the harmonic frequencies $n \cdot f_T$ or $f_T/n$ of resonant frequency $f_T$, where n is an integer greater than or equal to 2. In other words, the deformable shaft and the scanning element are designed so as to uphold the following four rules simultaneously:

$f_T \neq n \cdot f_B$
$f_T \neq f_B/n$
$f_B \neq n \cdot f_T$
$f_B \neq f_T/n$ where (n=2, 3, . . . )

Of course, $f_T$ may not equal $f_B$.

As was discussed above, FIG. 9 illustrates the fact that the vibrating element responds to drive frequencies n times greater than its resonant frequency $f_m$ (in this embodiment, $f_m$ stands for either $f_T$ or $f_B$) and to frequencies 1/n times as great (n is an integer which is greater than or equal to 2). The element will vibrate at an amplitude ranging from ½ or ⅓ to 1/20 or 1/30 the amplitude of vibration achieved when the drive frequency is equal to the resonant frequency $f_m$. It follows, then, that a scanner designed will not experience parasitic vibration in, for example, the bending mode around axis Q when scanning element 3 is being driven at resonant frequency $f_T$ to cause it to rotate around axis P. Such parasitic vibration would result if resonant frequency $f_T$ conformed to one of the harmonic frequencies $n \cdot f_B$ or sub-harmonic frequencies $f_B/n$ of the bending mode of deformation. Conversely, vibration in the twisting mode will not be induced by interference between the modes while the element is being made to vibrate in a bending mode. As a result, the light beam can be caused to scan in each axial direction with greater accuracy.

Figure 9:
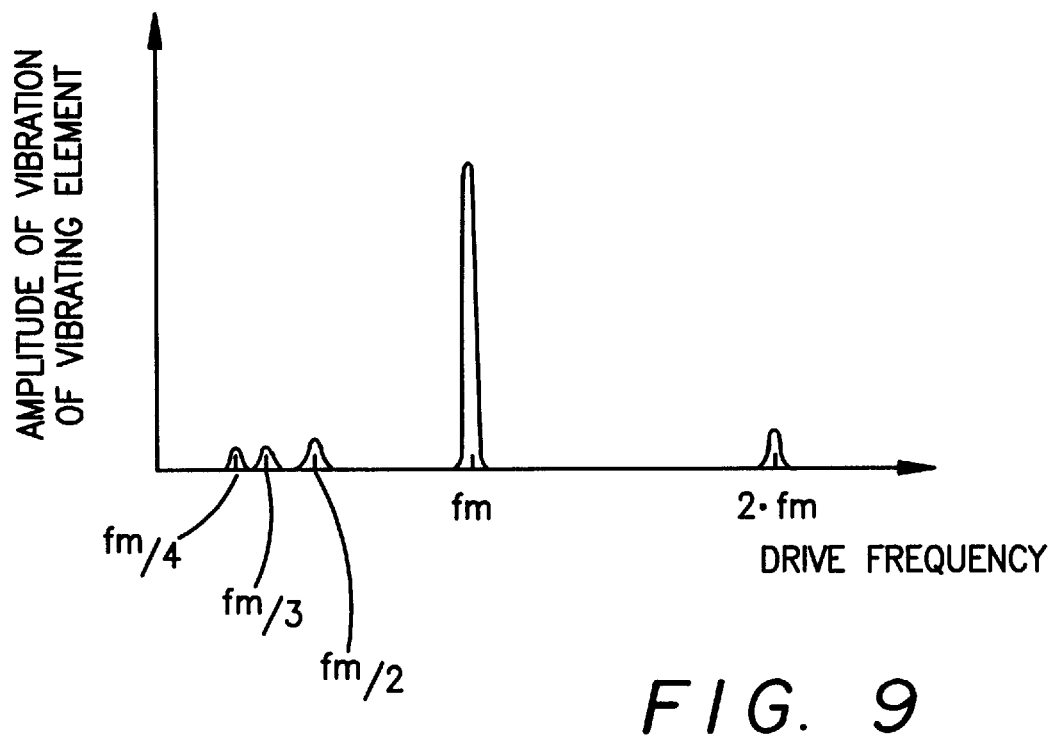
FIG. 9 is a graph illustrating the relationship between the drive frequency of the vibrating element and the amplitude of vibration.
Figure 10:
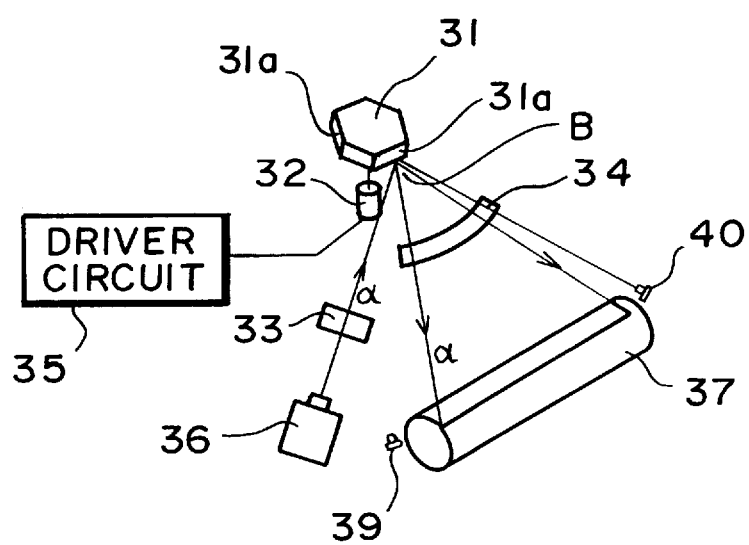
FIG. 10 is a perspective view of an example of an existing optical scanner.

As can be seen clearly in FIG. 9, the spectra of the harmonic frequency components are spread. This means that vibration will be generated in vibrating element 7 at frequencies in the vicinity of the harmonic frequencies $n \cdot f_T$, $f_T/n$, $n \cdot f_B$ and $f_B/n$. Consequently, if one wishes to completely eliminate interference between different modes of deformation, it will be necessary to completely remove any overlap among the resonant frequencies and harmonic frequencies, taking into account the spread of each frequency component into nearby spectral domains.

However, it has been determined experimentally that the overlap among the resonant frequencies and harmonics need not be completely eliminated. A sufficient result is obtained by shifting the value of every harmonic of the resonant frequency of each mode of vibration away from the resonant frequency of the other mode by at least 10% of the value of that resonant frequency. As an example, the harmonics $n \cdot f_T$ and $f_T/n$ of twisting mode will be separated by 10% of the value of $f_B$, the resonant frequency of bending mode. That is, $$|n \cdot f_T - f_B| > 0.1 f_B$$

and $$|f_T/n - f_B| > 0.1 f_B$$

(n=2, 3, ...)
Further, the harmonics $n \cdot f_B$ and $f_B/n$ of the bending mode will be separated by 10% of the value of f Ti the resonant frequency of the twisting mode. That is, $$|n \cdot f_B - f_T| > 0.1 f_T$$

and $$|f_B/n - f_T| > 0.1 f_T$$

(n=2, 3, ...)
The separation of frequencies can also be accomplished as follows. The resonant frequency of each mode of vibration can be shifted away from the harmonics of the other mode of vibration by at least 10% of its own value. If we use the embodiment as an example, the resonant frequency $f_T$ of twisting mode will be shifted away from the harmonics $n \cdot f_B$ and $f_B/n$ of the bending mode by 10% of the value of the resonant frequency $f_B$ of the bending mode. That is, $$|f_T - n \cdot f_B| > 0.1 f_B$$

and $$|f_T - f_B/n| > 0.1 f_B$$

(n=2, 3, ...)
Further, the resonant frequency $f_B$ of bending mode will be shifted away from the harmonics $n \cdot f_T$ and $f_T/n$ of twisting mode by 10% of the value of the resonant frequency $f_T$ of twisting mode. That is, $$|f_B - n \cdot f_T| > 0.1 f_T$$

and $$|f_B - f_T/n| > 0.1 f_T$$

(n=2, 3, ...)
The value of 10% can also be computed as 10% of the value of any harmonic.

Shifting the frequency in this way naturally results in the fact that it is impossible for the resonant frequencies $f_T$ and $f_B$ to overlap.

The optical scanner of this invention is not limited to the form depicted in the embodiment described above. Various design changes are possible as long as the basic concept is not violated. For example, instead of using a piezoelectric or magnetostrictive actuator as the actuator for the drive source, any actuator capable of infinitesimal vibration at high speed may be used. One might, for example, use an actuator which produces infinitesimal vibration through the use of static electricity. The plate shown in the diagrams is one example of how the vibrating element might be formed. Any form is acceptable which renders the element capable of at least two modes of elastic deformation.

The thus described embodiment of this invention eliminates interference vibration in another mode of vibration due to the harmonic content of vibration in the desired mode. As a result, the segregation of the various modes of vibration during scanning in a single mode is preserved; harmonics of another mode of vibration are prevented from occurring while the vibrating element is being driven at the resonant frequency of a given mode; and the accuracy of scanning is prevented from deteriorating.

When the scanner is used in the optical scanning system of, for example, a laser printer, the print quality will be enhanced. This scanner, then, has the effect of improving the quality of any device in which it is employed.

Another embodiment of this invention is shown in FIGS. 11–14.

In this embodiment, the same reference numbers are used to designate like parts in FIG. 1. These like parts are not described again in detail.

In this second embodiment of the invention a reflective mirror 45 is positioned facing mirror surface 4 and is fixed in place.

Figure 11:
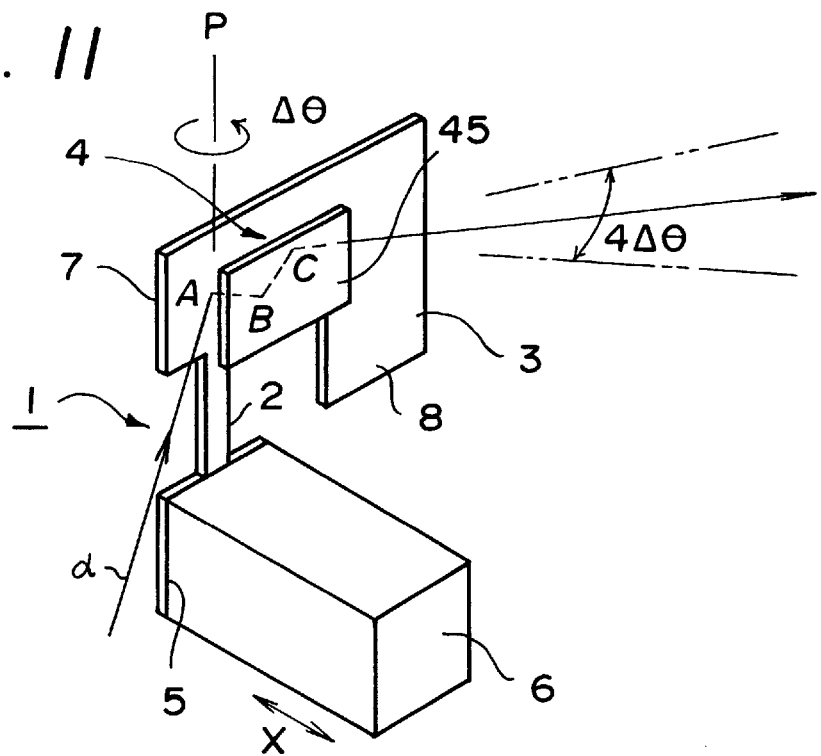
FIG. 11 is a perspective view of another embodiment of this invention.

As with the first embodiment, drive source 6 is made to vibrate at a given frequency, and this vibration is applied to vibrating element 5. This vibrating element will undergo reciprocating oscillation in direction X, as shown in FIG. 11. Inertia acts on scanning element 3 to cause shaft 2 to elastically deform and vibrate in the direction in which inertia is applied. Resonant frequency $f_T$, which characterizes the twisting mode, and resonant frequency $f_B$, which characterizes the bending mode, are determined by the modulus of elasticity, inertial moment, and other aspects of deformable shaft 2. When the drive frequency f which is applied to vibrating element 5 matches one of these resonant frequencies, elastic vibration of the given mode will be amplified in deformable shaft 2, and scanning element 3 will rotate over a large angle of rotation.

Figure 12:
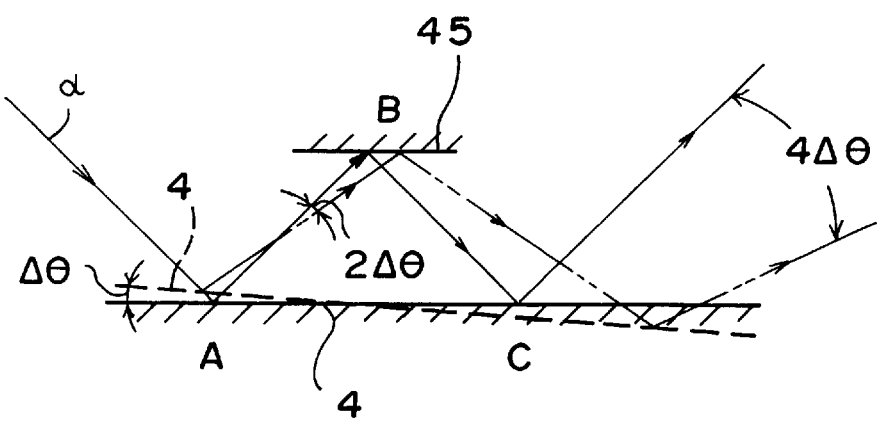
FIG. 12 is a diagram illustrating how the FIG. 11 embodiment works.

Let us now assume, with reference to FIG. 12, that laser beam α strikes mirror surface 4 at point A. It is then reflected by mirror surface 4 and strikes reflective mirror 45 at point B, from which it is again reflected back to point C on mirror surface 4. If at this time deformable shaft 2 is vibrated in either of the modes of deformation shown in FIG. 11, for example, around axis P, scanning element 3 will rotate over angle Δθ. Laser beam α, reflected at point A off mirror surface 4, will be caused to scan over an angle which is twice the angle over which the scanning unit is rotating, or $2\Delta\theta$. Laser beam $\alpha$ will thus scan over an angle $2\Delta\theta$ when it is reflected off reflective mirror 45 at point B, and over an angle of $4\Delta\theta$ when it is again reflected off mirror surface 4 at point C. In other words, a scanning angle can be achieved ($4\Delta\theta$) which is twice that obtained ($2\Delta\theta$) when reflective mirror 45 is not employed. Thus the scanning angle can be amplified easily by the simple structural addition of reflective mirror 45.

The deformable shaft 2 is in the form of a narrow isthmus, as shown in FIGS. 1 and 11. Thus when the amplitude of vibration of shaft 2 is greatly increased in order to widen the scanning angle, there is a danger that the shaft may be damaged. In the embodiment illustrated in FIG. 11, the scanning angle is widened optically by the use of the reflective mirror 45, so the amplitude of vibration of deformable shaft 2 can be kept at an appropriate level. Thus the durability of this optical scanner is superior to that of existing scanners.

Although in FIG. 12 laser beam $\alpha$ is reflected twice by mirror surface 4, the concept is by no means limited to two reflections. If, for example, laser beam $\alpha$ is reflected three times by mirror surface 4 by way of reflective mirror 45, a scanning angle of $4 \times 2\Delta\theta$ will be obtained. If it is reflected four times, the angle will be $8 \times 2\Delta\theta$. The number of times the beam is to be reflected can be designated as required. The reflective mirror 45 can be supported in any manner which is convenient, such as by its own fixed support arm which may be connected to the back of reflective mirror 45. A support configuration may be chosen which is appropriate for the conditions of use and other factors which may differ for different applications. The same applies to the materials used for the reflective mirror, its shape, the number of such mirrors to be used, and so on.

The reflective mirror may also be mounted to be moveable so that its position can be adjusted with respect to the mirror surface. By adjusting the position of the reflective mirror it is possible to change the direction of the axis of scanning (the direction in which the laser beam is travelling when the scanner is at rest). It is thus possible to adjust the direction of scanning without changing the position of the optical scanner. The effect, then, is that the optical axis can be adjusted.

Figure 13:
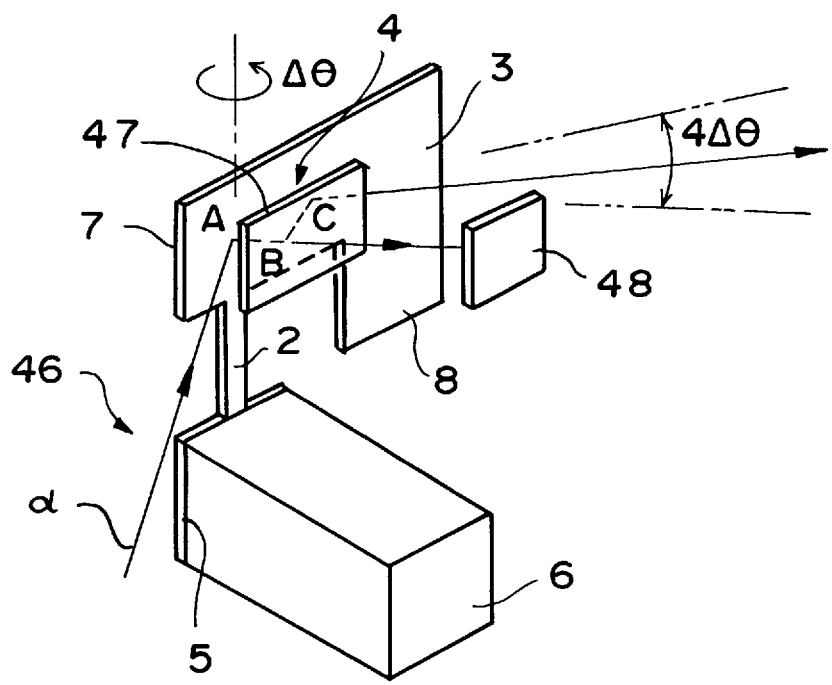
FIG. 13 is a perspective view of another embodiment of this invention.

FIG. 13 shows optical scanner 46 in another embodiment of this invention. In optical scanner 46 like parts to those of FIGS. 1 and 11 bear the same part members. In this embodiment a semitransparent panel 47, which transmits one portion of laser beam $\alpha$ and reflects the other portion, is placed opposite the mirror surface 4 of scanning element 3. Light position detection element (PSD) 48 is placed in the path of the laser beam transmitted by semitransparent panel 47.

Figure 14:
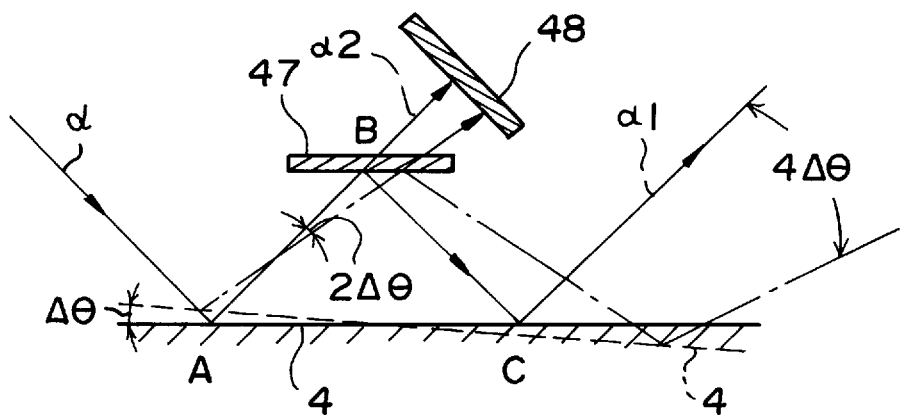
FIG. 14 is a diagram illustrating how the FIG. 13 embodiment works.

Let us now assume that laser beam $\alpha$ has struck mirror surface 4 at point A, as in FIG. 14. Laser beam $\alpha$ is reflected by the mirror surface 4 and strikes semitransparent panel 47, which is placed opposite the mirror surface, at point B. A portion of the laser beam, which we shall call monitor beam $\alpha_2$, is transmitted through panel 47 and strikes light position detection element 48. In this way the position of the light beam received by detection element 48 is detected. The portion of laser beam $\alpha$ which strikes semitransparent panel 47 at point B and is reflected by it is again directed toward mirror surface 4, where it is again reflected at point C. If at this time deformable shaft 2 is made to vibrate in either of its modes of deformation, as shown in FIG. 6, scanning element 3 will rotate over an angle of $\Delta\theta$. Laser beam $\alpha$, reflected by mirror surface 4 at point A, will scan over an angle twice as large as the angle of rotation of scanning element 3, or $2\Delta\theta$. This laser beam, reflected by semitransparent panel 47 at point B, and scanning over an angle of $2\Delta\theta$, is again reflected by mirror surface 4 at point C. This re-reflected beam, which we shall call laser beam $\alpha_1$, will scan over an angle of $4\Delta\theta$. In this way a wide angle of scanning can be achieved. The direction of travel of monitor beam $\alpha_2$, which has passed through semitransparent panel 47, changes over an angle of $2\Delta\theta$. The direction of travel of scanning beam $\alpha_1$ has a direct correspondence with that of the monitor beam. If the position of monitor beam $\alpha_2$ when it is received by light position detection element 48 is detected and the change in the position of the light received is output in the form of output voltage by detection element 48, then the scanning position of laser beam $\alpha$ can be communicated as an electrical signal at the user's discretion.

In the FIG. 13 embodiment, the light position detection element 48 detects the light beam which passes through the semitransparent panel 47. However, the opposite configuration can also be adopted, i.e., using the light beam which has passed through the semitransparent panel 47 as the scanning beam and that which has been reflected by the panel 47 and again by the mirror surface 4 as the monitor beam. In this case the reflected beam would be the one detected by the light position detection element 48. This configuration enables the light position detection element to magnify the changes in the position of the light it receives. It thus allows the system to detect the scanning position with great accuracy even if the light position detection element is placed quite close to the mirror surface. It also allows the scanner to be made more compact.

With the embodiment shown in FIGS. 13 and 14, the light reflected by the semitransparent panel 47 could also be re-reflected by the mirror surface 4 three or more times. In this case, the light transmitted by the panel could be obtained in several places. One of these locations would be chosen as the site for the light detection element. The shape of the semitransparent panel, its materials, its transmissivity, and so on, are not critical as long as it is capable of transmission and reflection. For the device 48 any detector may be selected which is capable of detecting the position of photoreception or the position of incidence of the light beam. This detector is not limited to a single light position detection element as a multisegmented photodiode, a charge coupled device (CCD) or some similar detector may also be used. Likewise, the position in which the light beam detection device is mounted, the direction it faces, and so on are not limited to those described above, but may be determined to suit the circumstances in which the scanner is to be used.

As with the earlier embodiments, the optical scanner of FIGS. 11–14 is not limited to the form particularly described above. Various design changes are possible as long as the basic concept is not violated. For example, the surface of the scanning element itself need not be fashioned into a mirror. A discrete mirror may instead be attached to the surface of the scanning element. The drive source in the embodiment may be a piezoelectric or magnetostrictive actuator; however, any actuator capable of infinitesimal vibration at high speed may be used. One might, for example, use an actuator which produces infinitesimal vibration through the use of static electricity. In the embodiment described above, the two resonant frequencies $f_T$ and $f_B$ have two different values. These resonant frequencies can be set at the user's discretion by selecting values for the modulus of elasticity and inertial moment of the deformable shaft, by selecting the shape of the plate, and so on. Also, in the embodiments of FIGS. 11–14, the resonant frequencies $f_T$ and $f_B$ may conform to each other, as well as being different as described in connection with the embodiments shown in FIGS. 1–9.

The FIGS. 1–14 embodiments also feature an optical scanner in which a laser beam is caused to scan in two directions. However, an optical scanner of the type in which a light bear scans in a single direction, as disclosed in U.S. patent application Ser. No. 07/741,353, filed Aug. 7, 1991, may also be employed.

The embodiment of the invention described in connection with FIGS. 11–14, enables the production of an ultracompact optical scanner in which it is possible to change the direction in which the light beam scans as well as the width of the area scanned (or the angle over which the beam scans). The angle over which the light beam scans can be amplified by means of the reflective mirror 45. The angle of rotation of the deformable shaft can thus be increased by a factor of at least four, and the light beam can thus be made to scan over a large angle.

In addition, by using a semitransparent panel 47 in place of reflective mirror 45, a portion of the light beam is reflected while the remaining portion is transmitted through the panel. The beam can thus be split into a scanning component and a component which can be used to detect the scanning position. This design allows accurate position detection at any time in the region between the inception and completion of the scan. This scanner, then, can take the place of a highly accurate optical scanner with good repeatability and so enable the user to lower his costs. Moreover, as there is no need to curtail the effective scanning angle of the light beam, the range which the optical scanner is capable of covering can be utilized to its fullest.

Since the scanner described in connection with FIGS. 13 and 14 uses a light beam which has been reflected at least twice by a mirror surface for scanning, and the light transmitted by a semitransparent panel to detect the position of the light, it is thus capable of continuously monitoring the location of the scanning beam. This design also allows the angle over which the light beam scans to be increased. If, conversely, the light beam reflected at least twice by the mirror surface 4 is used to detect the position of the scanning beam while the beam transmitted by the semitransparent panel 47 is used for scanning, the accuracy and resolution of detecting the position of the beam can be increased.

Figure 15:
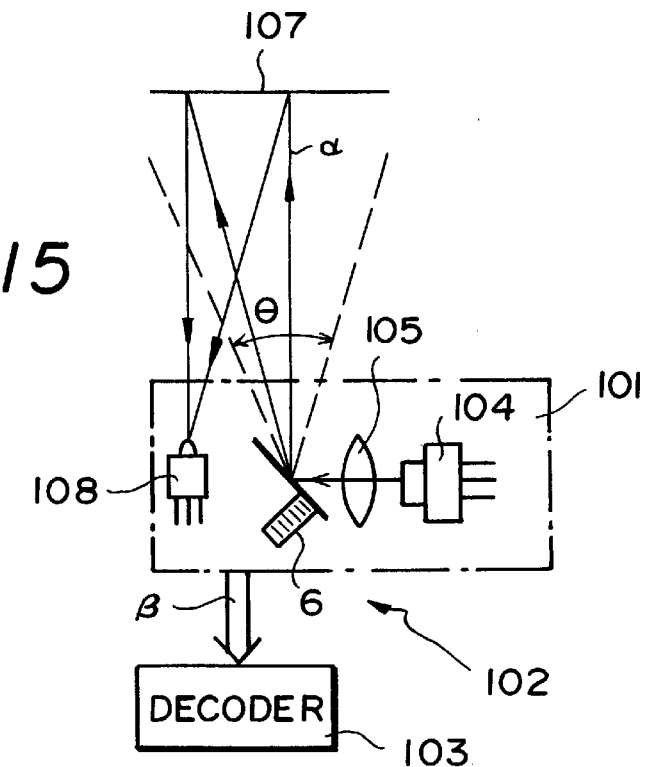
FIG. 15 is a schematic drawing of a bar code reader which uses a bar code scanner of the invention.

Another embodiment of the invention, FIG. 15 is a schematic drawing of bar code reader 102, in which a hand-held bar code scanner contained within a manually graspable housing 101 is employed. The actual shape of the housing is not important. The bar code scanner may take any of the forms described above and illustrated in FIGS. 1, 11 or 13. Bar code reader 102 comprises the hand-held bar code scanner within housing 101; and decoder 103, which decodes the bar code information using the signal output by the hand-held bar code scanner.

The bar code scanner within housing 101 comprises light source 104, which may be a semiconductor laser element or a light emitting diode (LED) to emit light beam α; a lens 105, which focuses the light beam emitted by light source 104 and causes it to strike optical scanner 106; optical scanner 106, which reflects light beam α after it is shaped by lens 105 and causes it to scan; and photodetector element 108, which detects the amount of light that is reflected when light beam α scans bar code 107.

After light beam α is emitted by light source 104, it is focussed and shaped by lens 105 and caused to strike optical scanner 106. Scanner 106 reflects light beam α while its reflective surface is moving, causing the light beam to scan.

If at this time bar code (or bar code label) 107 is situated within the scanning range θ covered by light beam α, photodetector element 108 will detect the amount of light reflected as light beam α scans the bar code. The difference in reflectivity between the lines and spaces in bar code 107 will be output by photodetector element 108 as photoreception signal β, which will correspond to the pattern of bar code 107. Decoder 103 will convert the signal representing the light detected by photodetector element 108 into the information stored in bar code 107, i.e., numerals, symbols, or whatever. In this way it decodes bar code 107.

Figure 16:
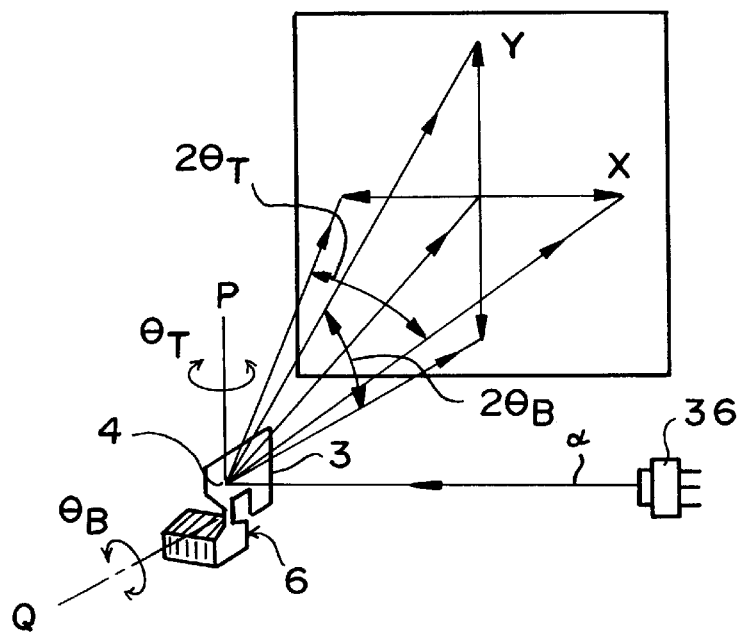
FIG. 16 is a perspective view of the paths traced by a light beam when the beam is made to scan by the bar code scanner of FIG. 15.

FIG. 16 illustrates the operation of the bar code scanner contained in housing 101. When a drive circuit causes drive source 6 to vibrate at a frequency equal to resonant frequency $f_T$ of twisting mode, deformable shaft 13 undergoes torsional deformation, and scanning element 15 is made to rotate to the left and right over angle of rotation $\theta_T$, as shown in FIG. 16. If at this time light beam α is made to strike mirror surface 14 of scanning element 3 as shown in FIG. 16, the reflected laser beam α will scan left and right in plane X over an angle of $2\theta_T$. Thus if bar code 107 is oriented sideways, as shown in FIG. 17(a), the scanning of light beam α described above will enable bar code reader 102 to read the bar code.

When the drive circuit causes drive source 6 to vibrate at a frequency equal to resonant frequency $f_B$ of bending mode, deformable shaft 13 undergoes flexural deformation, and scanning element 15 is made to rotate up and down over angle of rotation $\theta_B$, as shown in FIG. 16. If at this time light beam α is made to strike mirror surface 14 of scanning element 3, the reflected light beam α will scan up and down over an angle of $2\theta_B$. Thus if bar code 107 is oriented vertically, as shown in FIG. 17(b), the scanning of light beam α described above will enable bar code reader 102 to read the bar code.

In this way the bar code scanner of this invention can cause light beam α to scan in two orthogonal planes (planes X and Y). It can therefore read bar code 107 no matter whether the code is oriented horizontally, as shown in FIG. 17(a), or vertically, as in 17(b). This invention thus obviates the need to reposition the product whose bar code is being scanned or reorient the housing 101 of the bar code scanner, a problem experienced with existing scanners. The bar code scanner within housing 101 is also furnished with a directional switch 14, as shown in FIG. 7, which enables the operator easily to change the direction or plane of scanning. As shown in FIG. 20, a switching circuit may also be provided for the scanning direction which switches the scanning direction automatically at short intervals by simply operating switch 14 with the output of a low frequency oscillator 110. This circuit enables bar code 107 to be read automatically no matter what its orientation.

Further, if a signal from the drive circuit is applied to drive source 6 in which a signal of resonant frequency $f_T$ of twisting mode and a signal of resonant frequency $f_B$ of bending mode are superposed, then drive source 12 will cause vibrational input element 14 to vibrate in a mode in which the two types of vibration are superposed. Both torsional and flexural vibration will be amplified in deformable shaft 13, and scanning element 15 will be made to vibrate over angle of rotation $\theta_T$ around axis P and over angle of rotation $\theta_B$ around axis Q. Light beam α will be made to scan in two dimensions. The track which this two-dimensional scan will follow is determined by the ratio of rotational angle $\theta_T$ to rotational angle $\theta_B$. For example, FIG. 18 shows the track $\alpha_T$ scanned by the light beam when the ratio of rotational angle $\theta_T$ of twisting mode to rotational angle $\theta_B$ of bending mode is 1:1. In this case, the track $\alpha_T$ followed by the light beam describes a Lissajous figure. The track here is inclined 45° from both the horizontal plane X and the vertical plane Y. If this two-dimensional scan is combined With scans of the X and Y planes, by, for example, automatically switching among the resonant frequencies $f_T$, $f_B$ and $f_T+f_B$, the scanner will be able to read the information in bar code 107 in virtually any way it may be oriented. In the example pictured in FIG. 18, the ratio of $\theta_T$ to $\theta_B$ was 1:1; however, this ratio may assume other proportions.

The bar code scanner of this invention can employ a built-in two-axis optical scanner which is quite compact and light. This scanner housing 101 can be as small as 15 mm×15 mm×10 mm and it can weigh less than 5 grams. Consequently, the bar code scanner, too, can be made small and lightweight. Unlike the stationary multi-axis bar code scanners which can be found in supermarkets, this bar code scanner is especially useful as a hand-held scanner. The operator can easily hold the scanner housing 101 in his hand to read the bar code.

With the FIG. 15 embodiment of the invention, a light beam can be scanned along a bar code even if the code is tilted with respect to the scanner. In this way a tilted bar code can be read. Consequently, there is no need to reposition the bar code or reorient the bar code scanner. Bar codes can be read quickly and the nuisance factor for the operator is reduced.

Further, as the optical scanner used is smaller and lighter than a conventional polygonal mirror and a servomotor, the bar code scanner itself can assume a more compact and lightweight form. As a result, a small, light, hand-held bar code scanner can be produced. This hand-held scanner is capable of scanning along multiple axes, a function which in the past could be found only in stationary scanners.

While several embodiments of the invention and variants thereof have been described and illustrated, many modifications can be made to the invention without departing from its spirit and scope. Accordingly, the invention is not limited to the foregoing description, but is only limited by the scope of the appended claims.

I claim:

1. An optical scanner comprising:

a light beam source;

a vibrating element having at least two modes of vibration respectively in at least two planes, said vibrating element having respective resonant frequencies associated with each of the modes of vibration which are not integral multiples of each other;

means for driving said vibrating element at substantially its resonant frequency in each of said two modes to cause it to thereby rotate said vibrating element in said at least two planes; and a scanning surface which receives and reflects a light beam from said source and which moves in association with movement of said vibrating element;

wherein each harmonic frequency of the resonant frequency of one mode of vibration is separated from the resonant frequency of the other mode of vibration by at least 10% of the value of the resonant frequency of said other mode of vibration.

2. An optical scanner comprising:

a light beam source;

a vibrating element having at least two modes of vibration respectively in at least two planes, said vibrating element having respective resonant frequencies associated with each of the modes of vibration which are not integral multiples of each other;

means for driving said vibrating element at substantially its resonant frequency in each of said two modes to cause it to thereby rotate said vibrating element in said at least two planes; and a scanning surface which receives and reflects a light beam from said source and which moves in association with movement of said vibrating element;

wherein each harmonic frequency of the resonant frequency of one mode of vibration is separated from the resonant frequency of the other mode of vibration by at least 10% of the value of the resonant frequency of said one mode of vibration.

3. An optical scanner comprising:

a light beam source;

a vibrating element having at least two modes of vibration respectively in at least two planes, said vibrating element having respective resonant frequencies associated with each of the modes of vibration which are not integral multiples of each other;

means for driving said vibrating element at substantially its resonant frequency in each of said two modes to cause it to thereby rotate said vibrating element in said at least two planes; and a scanning surface which receives and reflects a light beam from said source and which moves in association with movement of said vibrating element;

wherein each harmonic frequency of the resonant frequency of one mode of vibration is separated from the resonant frequency of the other mode of vibration by at least 10% of the value of any harmonic of either of said resonant frequencies.

4. An optical scanner comprising:

a light beam source;

a vibrating element having at least two modes of vibration respectively in at least two planes, said vibrating element having respective resonant frequencies associated with each of the modes of vibration which are not integral multiples of each other;

means for driving said vibrating element at substantially its resonant frequency in each of said two modes to cause said element to rotate in said at least two planes;

a scanning surface which receives and reflects a light beam from said source and which rotates in said at least two planes in association with the vibration of said vibrating element in said at least two vibration modes; and a reflective element positioned relative to the scanning surface of the scanning element, such that said scanning surface reflects a light beam from said source to said reflective element which in turn reflects at least a portion of the light beam back to said scanning surface.

5. An optical scanner as in claim 4, wherein said reflective element is a mirror which reflects substantially all of said light beam back to said scanning surface.

6. An optical scanner as in claim 4, wherein said reflective element is a semitransparent panel which reflects a portion of said light beam back to said scanning surface and which transmits therethrough another portion of said light beam.

7. An optical scanner as in claim 4, wherein said reflective element is spaced from and faces said scanning surface.

8. An optical scanner as in claim 7, wherein said reflective element is held in a fixed position.

9. An optical scanner as in claim 7, wherein said reflective element is movable relative to said scanning surface.

10. An optical scanner as in claim 6, further comprising means for detecting at least one of the portion of the light beam reflected by said semitransparent panel and the portion of the light beam transmitted therethrough.

11. An optical scanner as in claim 5, wherein the light beam reflected back to said scanning surface emerges from said scanning surface as a scanning beam.

12. An optical scanner as in claim 6, wherein one of said portions of said light beam is used as a scanning beam.

13. An optical scanner as in claim 4, further comprising a hand-held housing for said optical scanner.

14. A bar code scanner comprising:

a light beam source;

a scanning member including a deformable shaft, said scanning member having at least two modes of elastic deformation in two respective planes and respective resonant frequencies associated with each said mode; a vibrational input unit coupled to one end of said deformable shaft;

a reflection element coupled to the other end of said shaft to reflect a light beam from said source to a bar code;

a drive source for inducing oscillation in said scanning member causing said reflection element to rotate in at least one of said two planes;

a photodetector element which receives light reflected from a bar code illuminated by said light beam; and a hand-held housing containing said light beam source, scanning member, reflection element, drive source and photodetector element.

15. A bar code scanner as in claim 14, further comprising means for causing said scanning member to selectively move in said two respective planes.

16. A bar code scanner as in claim 15, wherein said means for causing switches between said respective resonant frequencies which are applied by said drive source to said scanning member.

17. A bar code scanner as in claim 14, further comprising means for causing said scanning member to move in said two respective planes.

18. A bar code scanner as in claim 17, wherein said means for causing causes said drive source to simultaneously apply said respective resonant frequencies to said scanning member.

* * * * *